July 6, 1965 T. D. SMITH 3,192,779
INDICATOR MECHANISM
Filed Feb. 10, 1964 4 Sheets-Sheet 1

INVENTOR
THEODORE D. SMITH
BY Eugene M. Whitacre
Attorney

July 6, 1965 T. D. SMITH 3,192,779

INDICATOR MECHANISM

Filed Feb. 10, 1964 4 Sheets-Sheet 2

INVENTOR.
THEODORE D. SMITH
BY Eugene M. Whitacre
Attorney

INVENTOR
THEODORE D. SMITH
BY Eugene M. Whitacre
Attorney

July 6, 1965 T. D. SMITH 3,192,779

INDICATOR MECHANISM

Filed Feb. 10, 1964 4 Sheets-Sheet 4

INVENTOR
THEODORE D. SMITH
BY Eugene M. Whitacre
Attorney

United States Patent Office 3,192,779
Patented July 6, 1965

3,192,779

INDICATOR MECHANISM

Theodore D. Smith, Indianapolis, Ind., assignor to Radio Corporation of America, a corporation of Delaware Filed Feb. 10, 1964, Ser. No. 343,787
12 Claims. (Cl. 74—10)

The present invention relates to indicator mechanisms and more particularly to channel indicator mechanisms for step-by-step television receivers.

Present authorization for the transmission of television signals includes 12 channels in the very high frequency (VHF) band and 70 channels in the ultra high frequency (UHF) band. Many receivers manufactured for home use include stey-by-step tuning of the VHF television channels with a corresponding display of each channel number, and continuous tuning of the UHF channels with only an approximate indication of a selected UHF channel. With increased numbers of UHF stations, it is desirable, from the consumers' and the broadcasters' points of view, to provide the same general type of tuning operation for UHF channels as for VHF channels with a correspondingly more precise UHF channel indication.

For UHF television reception, it is desirable that the associated channel indicator means display the number of the selected channel in ample proportions to be easily observed from a convenient viewing distance yet be small enough to permit its use in relatively small size receiver cabinets.

It is an object of this invention to provide an improved television channel indicator mechanism.

It is a further object of this invention to provide an improved television channel indicator mechanism for a step-by-step ultra high frequency television tuner.

It is also an object of this invention to provide an improved channel indicator mechanism for a step-by-step ultra high frequency preset television tuner capable of indicating any selected channel in the ultra high frequency band.

A further object of this invention is to provide an improved and economical channel indicator mechanism of relatively small size capable of indicating any selected one of the 70 UHF channels in ample proportions to be clearly seen from a convenient viewing distance.

It may be assumed that the useable UHF signals in any given location will be separated by a predetermined number of channels. For example, it may be presumed that in any given area serviced by more than one UHF station, the channel allocations will be separated by at least three channels. In such a case, the UHF tuner may, for example, be provided with a main tuner drive mechanism with twenty-four spaced detent positions, each of which is capable of receiving three different UHF channels except for two of the positions which would receive two UHF channels. A preset tuning mechanism may then be provided to select a given one of the channels in any one of the detent positions. It will be understood that a different number of detent positions may be provided.

The indicator mechanism of the invention includes a dial or scale member with a plurality of groups of consecutive channel numbers imprinted therein. The number of groups of imprinted channel numbers corresponds to the number of detent positions of the UHF tuner. The dial or scale member is coupled to the main tuner drive mechanism to bring a different group of channel numbers to a viewing aperture for each detent position of the tuner.

An indicating means or slide, coupled to the preset tuning mechanism, is moved relative to the dial or scale to indicate a particular channel number in the group of numbers brought into registery with the viewing aperture. The indicator mechanism is integrated with the tuning mechanism to indicate the number of the selected channel.

The invention will further be understood from the following description considered in connection with the accompanying drawings.

Figures 1, 3:
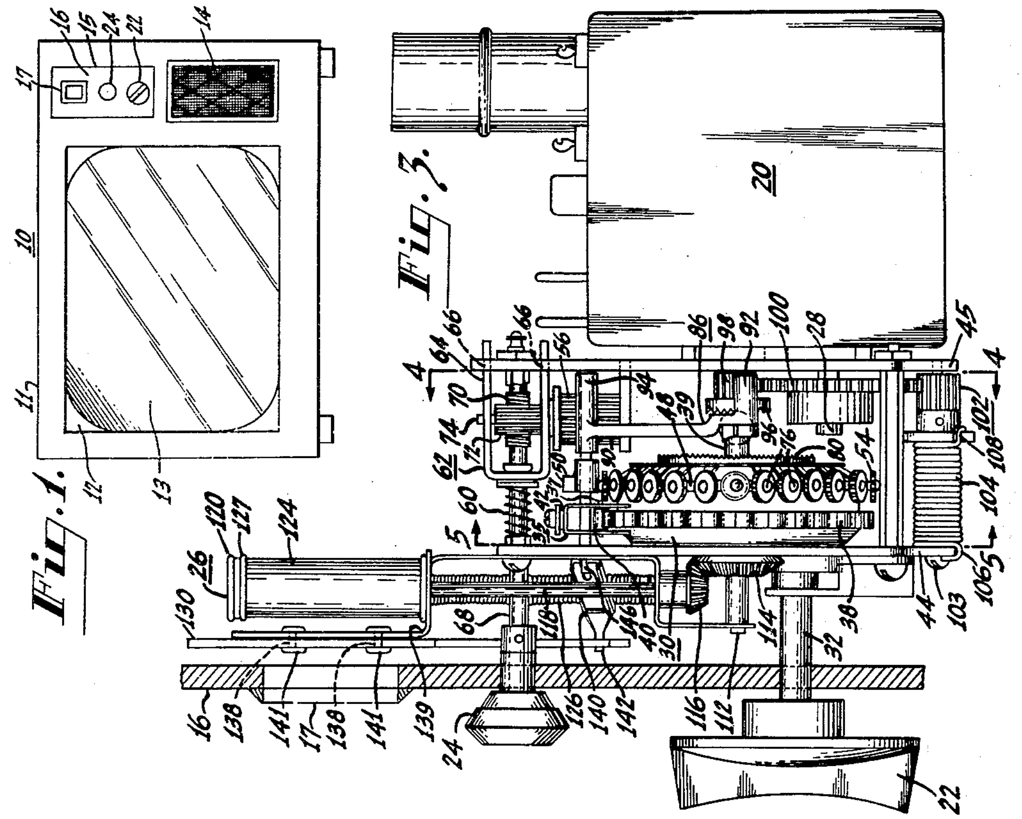
FIGURE 1 is a front view of a television receiver provided with a channel indicator mechanism.
FIGURE 3 is a side view of the channel indicator mechanism and preset tuning mechanism therfor of FIGURE 1.

Referring to the drawings, wherein like elements and parts are designated by like reference characters throughout the various figures, and referring particularly to FIGURE 1, a television receiver 10, for which the invention is adapted, may be of any suitable type such as a table model as shown, having a casing 11 in which is located the usual large frontal viewing opening or window 12 for the face of a kinescope or picture tube 13, together with a grilled loudspeaker opening 14 and operating panel 15. The latter includes a detachable escutcheon 16 in which is provided a central viewing opening or window 17 through which the channel selection or tuning setting of the receiver may be observed as indicated.

The tuning mechanism behind the escutcheon 16 includes an ultra high frequency tuner 20 suitably mounted for operation by a control knob 22 and a preset tuning knob 24. The tuner 20 is of the type which covers the entire UHF television band for 180° of the rotation of a tuner shaft 28 (FIGURE 3).

The tuner 20 is rough tuned to a portion of the band in which the desired channel is located by turning control knob 22 and observing the channel number indicated at the viewing window 17 presented by an indicator assembly 26.

Figure 5:
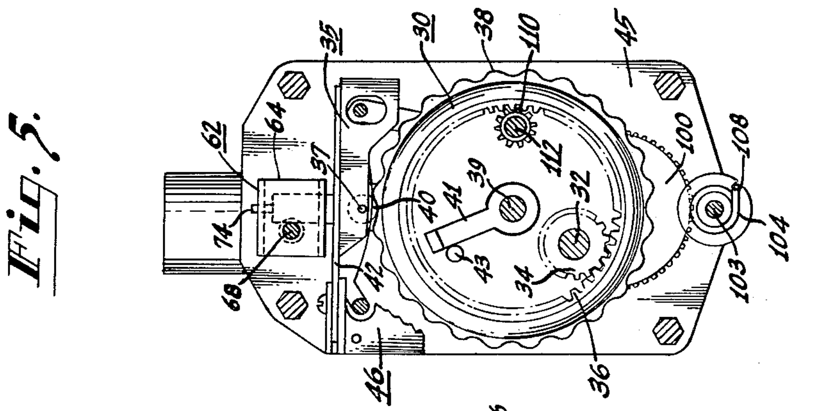
FIGURE 5 is a sectional view of the tuning mechanism taken on section lines 5—5 of FIGURE 3.

The knob 22 rotates a rotary turret 30 in the present example through a 3-to-1 step-down gear ratio. As seen in FIGURE 5, a shaft 32, on which the knob 22 is mounted, rotates a pinion gear 34 which, in turn, is coupled to mesh with a ring gear 36 which comprises an integral part of the turret 30. Three complete rotations of the knob 22 rotate the turret 30 through one revolution.

The turret 30 is mounted to rotate about a shaft 39 which extends between a pair of mounting brackets 44 and 45. Also mounted for rotation about the shaft 39 is a rotational limit cam 41 (FIGURE 5). The cam 41 limits the rotation of the turret 30 in both directions by engaging a pin 43 which rotates with the turret. The cam 41 includes a tab which extends forwardly, as viewed in FIGURE 2, through a window or slot 47 in the front mounting bracket 44. The pressure of the pin 43 forces the cam 41 against its stop in the slot 47 (FIGURE 2) preventing any further rotation in that direction.

The rotary turret 30 is detented for twenty-four equally spaced stop positions by the detent notches 38 provided over 360° of the periphery of the turret. However, a different number of detent positions may be provided if desired. With twenty-four detent stop positions for the rotary turret 30, each detent position permits the coverage of three channels except for the two detent positions on the extreme limits of rotation of the rotary turret, which cover two channels. A detent spring 42 is permanently mounted on the mounting bracket 44 through a support means 46. The detent spring 42 carries a detent assembly 35 on which a detent roller 40 bearing mounted to rotate about a detent assembly pin 37. The spring pressure of detent spring 42 causes the detent roller 40 to bear against the detent notches 38 to resiliently stop and hold the rotary turret 30 is any one of the twenty-four detent stop positions.

The rotary turret 30 also carries twenty-four equally spaced adjustable control elements or screws 48 (FIGURES 3, 4 and 6) extending radially from the periphery thereof as a means to provide a preset tuning arrangement at each detent position. The heads 54 of the tuning screws 48 are pinion gears which when rotated move the screws 48 radially in or out of the turret.

Figure 6:
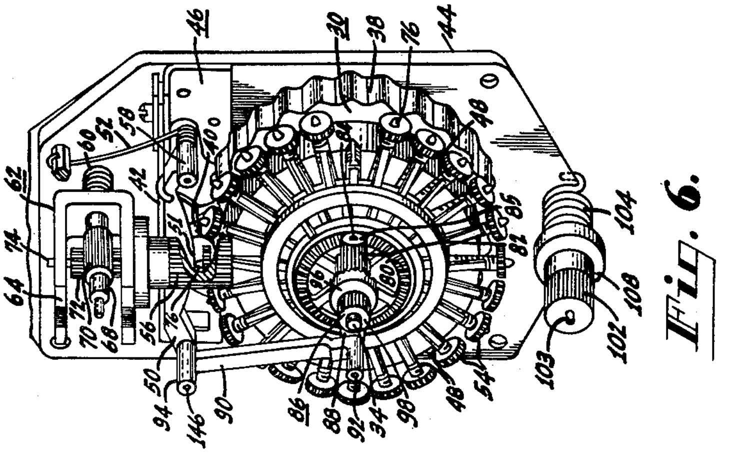
FIGURE 6 is a perspective sectional view of the tuning mechanism taken along section lines 4—4 of FIGURE 2.
Figure 4:
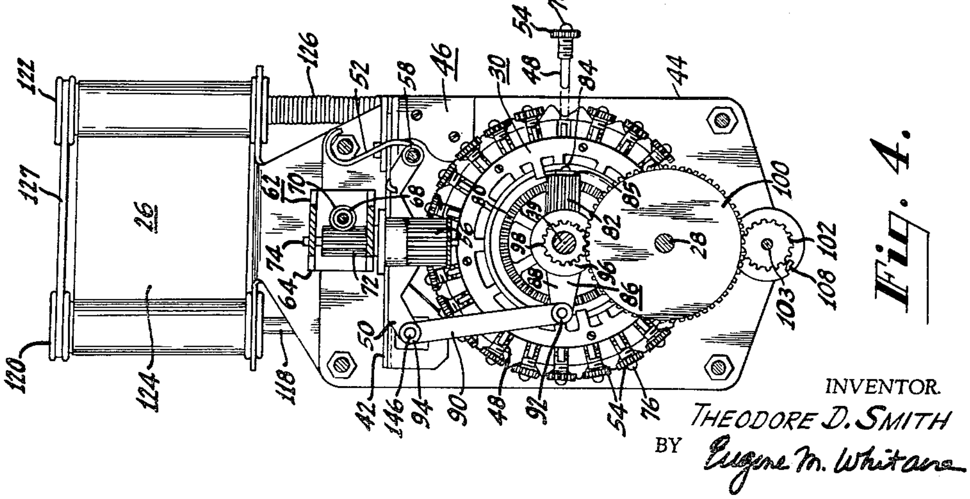
FIGURE 4 is a sectional view of the channel indicator and tuning mechanism taken on section lines 4—4 of FIGURE 3.

A channel preset tuning assembly 62 adjusts the settings of the tuning screws 48. The assembly is moved into the tuning position by pulling out on the knob 24 against the force of a spring 60, wherein a U-shaped frame 64 slides along the slots 66 until a gear 56 meshes with a pinion gear head 54 (FIGURES 3, 4 and 6). By simultaneously pulling outward and rotating the knob 24, the attached shaft 68 will rotate a worm gear 70, which in turn, will rotate a pinion gear 72, thereby rotating the tuning gear 56 through an attached shaft 74. In this position, the tuning gear 56 will mesh with one of the tuning screws pinion gear heads 54, and thereby will move the tuning screws 48 in or out depending upon the direction of rotation of the knob 24.

As shown in FIGURE 4, each of the tuning screws 48 (shown in exploded fashion) includes a rounded tip or cap 76. As shown in FIGURE 6, as the turret 30 is rotated through its various detent positions, the tips 76 of the tuning screws successively come into contact with a surface 51 of a pivotally mounted tuning lever arm 50. The lever arm 50 is spring biased by a spring 52 into contact with the tuning screw tips 76 as they successively rotate into position. By rotating the tuning screws 48 in or out, the movement of the screws, through the surface point 51, pivots the lever 50 about its fulcrum 58.

The motion of the lever arm 50 and the rotation of the turret 30 is transmitted to the tuner shaft 28 through a differential step-down gearing mechanism. The differential gearing mechanism comprises of an input crown gear 80, a common differential gear 82 and a differential output crown gear 96.

The input crown gear 80 (FIGURES 4 and 6) comprises an integral part of the turret 30 and rotates with the turret concentrically about the axis of the turret mounting shaft 39. The teeth on the crown gear 80 face perpendicular to the plane of rotation of the turret 30 and away from the turret toward the tuner 20.

The differential output gear 96 is also freely mounted to rotate about the turret mounting shaft 39. The teeth of the output gear 96 face perpendicular to the plane of rotation of the gear (and also perpendicular to the plane of rotation of the turret 30), away from the tuner 20 and toward the turret 30.

Mounted between the input crown gear 80 and the differential output gear 96 and meshing with both gears is the common differential gear 82. The common differential gear 82 is mounted to rotate about a shaft 84 while held in place, with a C ring 85. The shaft 84 is in turn, a part of a rotatable lever means 86. As shown in FIGURES 4 and 6, the rotatable lever means 86 is bearing mounted to rotate about the turret mounting shaft 39 forming a fulcrum joint.

Extending in opposite directions and perpendicular to the axis of the mounting shaft 39 as part of the lever means 86 are two lever arms, one being the gear mounting shaft 84 and the other an actuating lever arm 88. The purpose of the rotatable lever means 86 is to couple the motion of the tuning lever arm 50 into the differential gearing mechanism. This is done through the use of a connecting rod 90 bearing mounted between the tuning lever arm 50 and the actuating lever arm 88 through the bearings 94 and 92, respectively.

The action of the differential gearing mechanism can best be explained by referring to the motion of the turret 30 and the associated motion of the tuning lever 50 separately although actually occurring simultaneously when turret 30 is switched from one detent position to another. Taking the rotation of turret 30 alone, FIGURES 4 and 6 indicate that any rotation of the turret is transmitted by the crown gear 80 through the common differential gear 82 to the differential output gear 96. Assuming now that the turret 30 is set at a detent stop position and the appropriate tuning screw 48 is adjusted by the tuning preset mechanism 62, it can now be seen that the motion of the tuning screw is transmitted to the actuating lever arm 88 through the associated motion of the tuning lever arm 50 and the connecting rod 90. The force on the actuating lever arm 88 rotates the rotatable lever means 86 about the shaft 39, which in turn causes the common differential gear 82 to rotate about the shaft 84. Since the turret 30 is detented and therefore is not rotated, the rotary motion of common differential gear 82 is transmitted to rotate the differential output gear 96. As a result, as turret 30 is switched from one detent position to the next, the rotation of the turret 30 and the movement of the tuning lever arm 50 are both coupled together simultaneously through the common differential gear 82 to rotate the differential output gear 96 to a desired setting.

Fixed to the differential output gear 96 is a pinion gear 98, which also rotates about the shaft 39. The pinion gear 98 in turn meshes a tuner shaft pinion gear 100, permanently attached to the tuner shaft 28, in a step-down ratio (FIGURE 3). As a result, any rotation of the turret 30 and its associated movement of the tuning lever arm 50 is transmitted through the differential lever mechanism and gearing means in a step-down ratio to rotate the tuner shaft 28.

Also meshing with the tuner pinion gear 100, in opposition to the gear 98, is a spring biased anti-backlash gear assembly 102 mounted to rotate about a shaft 103 which extends between the mounting brackets 44 and 45. An anti-backlash spring 104 wound about the shaft 103 is preset with a fixed amount of tension and attached to mounting frame 44 at a point 106, while the other end 108 is attached to the anti-backlash gear assembly 102. As a result, the gear assembly 102 is spring torque biased through the spring 104 to urge against the gear 100 to remove any slack in the gearing system. In addition, since the anti-backlash gear assembly 102 is mounted to mesh with the gear 100 at a point approximately 180° away from the meshing of gears 98 and 100, the anti-backlash system also removes uneven lateral bearing pressure on the tuner shaft 28 due to the torques of the gearing system thereby enhancing the tuner resetability.

An indicator mcehanism 26 is provided to indicate the channel setting of the tuner 20. The indicator mechanism 26 is mounted directly behind window 17 (FIGURES 1 and 3) through which the channel selection or setting may be observed.

Figure 2:
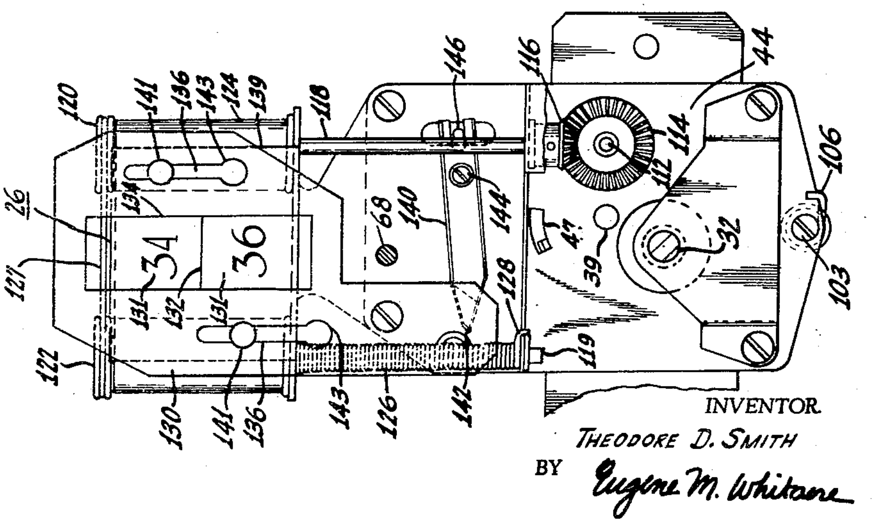
FIGURE 2 is a front view of the channel indicator mechanism for a UHF television tuner showing a preset tuning mechanism.

The movement of the turret 30 is picked up through a pinion gear 110 which meshes with the turret input ring gear 36 as shown in FIGURE 5. The rotation of the pinion gear 110 is transmitted through a shaft 112 to a bevel gear 114 (FIGURES 2 and 3). The bevel gear 114, in turn, meshes with a second bevel gear 116 which drives the indicator assembly 26 through a shaft 118.

The indicator assembly 26 consists of two spools 120 and 122 about which a celluloid tape 124 is wound. The celluloid tape wound about the spools is a long strip of material upon which, at predetermined points, an indicia of ultra high frequency channel numbers is imprinted. The tape 124 thus provides a dial or scale for the assembly 26. In the present example, each detent position of the turret 30 corresponds to a point at which a group of three consecutive channels can be tuned to. As shown in FIGURE 2, the extreme two of the three channels 131 available at the particular detent position are shown as imprinted on a portion of the celluoid tape 124. The third channel (channel 35) lies midway between the two listed channels. However, if desired, all three channels can be imprinted on the tape 124.

With 24 detent stop positions in the present example, the celluloid tape 124 is divided into twenty-two groups of three consecutive channel numbers and two groups of two consecutive channel numbers. The two two-channel groups will cover the two channels available to be selected at the extreme ends of the band while the three channel groups will cover the remaining channels. One two group marking will be located at the end of the tape covering the lower frequency channels 14 and 15 while the other two group marking will be at the opposite end of the tape covering the higher frequency channels 82 and 83. This will correspond with the tuning arrangement of the preset tuning mechanism as previously discussed.

The spool 120 is connected to the shaft 118 while the spool 122 is mounted to rotate about a shaft 119. The celluloid tape 124 is wound about the spool 120 and unwound from the spool 122, as the shaft 118 is turned clockwise as viewed from the bevel gear 116. The gear ratio and the spacing between the sets of channels marking on the celluloid tape 124 is so selected that a new set or group of channel markings are switched into a mid-position or a reference viewing position between the spools 122 and 120 for visual observation through window 17 as the rotary turret 30 is switched from one detent position to another.

A spring 126, wound about the shaft 119, is connected at one end to the spool 122 while the other end is attached to the mounting bracket 44 at a point 128. The spring 126 is preset with a fixed amount of spring tension designed to keep the celluloid tape 124 taunt between the spools 120 and 122. In addition, as the celluloid tape 124 is wound on the spool 120, the spool 122, while rotating in the process of unwinding its portion of the film, increases the spring tension in the spring 126. The added tension serves the purpose to rewind the celluloid tape back on the spool 122 from the spool 120 when the turret 30 calls for a counterclockwise rotation of the shaft 118. As before, the motion of the film 124 from the spool 120 to 122 is again synchronized with the rotation of the rotary turret from one detent position to the next. In addition to the spring 126, an elastic band 127 is connected between the spools 120 and 122 to insure a uniform rotation between the spools.

A vertically movable indicating slide or means 130 is shown in FIGURES 2 and 3 as part of the inductor assembly 26. The indicating slide 130 mounted between the window 17 and the celluloid tape 124. In the present example, the indicating slide 130 is made of an opaque plastic material except for a transparent window 134. Midway across the window 134, is a horizontal indicator line 132. The indicating slide 130 masks off all of the ceuuloid tape 124 except for the portion in the reference viewing position directly behind the window 134, thereby indicating only the channels which may be selected at that particular detent position. The indicator line 132 is used to denote which of the three available stations is selected at the detent position. If desired, the indicating slide 132 can be modified to merely carry an indicator line or a pair of pointers to denote the selected channel while window 17 can be used to mask off all of the celluloid tape 124 except for the portion of the tape in the reference viewing position directly behind window 17.

The indicating slide 130 is loosely positioned on the indicator assembly 26 by a pair of slots 136 cut therein and a pair of pins 138 mounted on an indicator mounting bracket 139. As shown in FIGURE 2, the slots 136 contain enlarged holes 143 at the lower end. The pins 138 have narrow bodies with enlarged heads 141. The indicating slide 130 is mounted by passing the enlarged heads 141 of the pins 138 through the holes 143 and then held in position by sliding the indicating slide 130 down to a point where the enlarged heads 141 will be a greater diameter than the slots. At this point, it can be seen that the indicating slide 130 is free to move up and down within the extremes of narrow slots 136 without disengaging from pins 138. Note, as the indicating slide 130 is moved up and down, the tuning line 132 also moves up and down to indicate the desired one of the available three channels at the detent position.

The vertical positioning of the indicating slide 130 and the attached tuning indicator tuning line 132 is dependent upon the positioning of the tuning lever arm 50 at the particular detent position. From FIGURES 2, 3 and 6, it can be seen that as the tuning screws 48 are adjusted to tune to the desired one of the available channels, the in and out motion of the screw results in rotating the lever 50 about its fulcrum 58, and thereby moves the attached shaft 146 in an arc about fulcrum 58. The vertical component of the motion of shaft 146 is transmitted to the indicator lever arm 140 causing the lever to rotate about its fulcrum 144. The indicator lever arm 140 is attached to the indicating slide 130 at a point 142 thereby raising or lowering the indicating slide 130 to set the tuning line 132 to the one of the three stations in the reference viewing position to which the tuner is tuned to at the particular detent position.

From the above description, it can be seen that once the channels are preset at each detent position, a subsequent rotation of the knob 22 to the same detent position will retune the tuner 20 to the preselected station, select the proper set of three channels to be displayed by the indicator assembly 26 in the reference viewing position behind window 17, and also reset the tuning line 132 to indicate the number of the preset channel.

Figure 8:
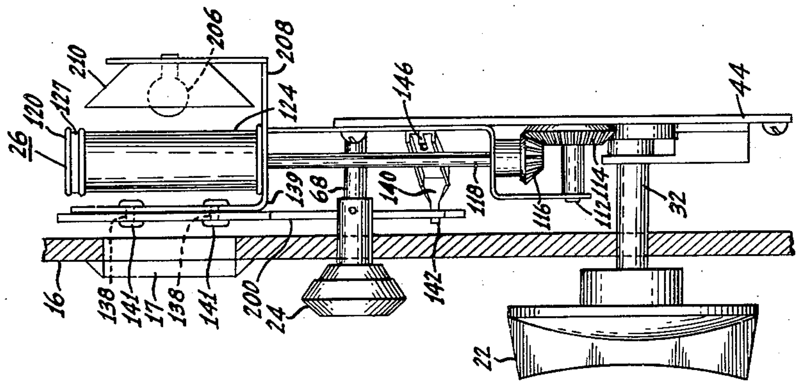
FIGURE 8 is a side view of the modification of the channel indicator mechanism as shown in FIGURE 7.
Figure 7:
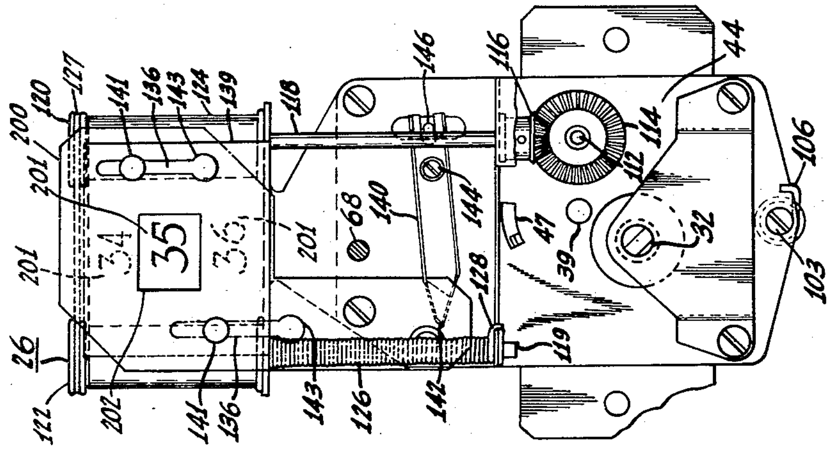
FIGURE 7 is a modification of the channel indicator mechanism shown in FIGURES 2–4, showing an adjustable window.

The indicator assembly 26 may be modified by substituting an indicating means or slide 200 (FIGURES 7 and 8) for the previously described indicating means or slide 130 (FIGURES 2 and 3). The remainder of the indicator assembly 26 remains substantially unchanged and therefore will be designated by the reference numerals as previously applied in FIGURES 1–6. The modification eliminates the need for the indicator line 132 on the indicating slide 130 by substituting the window 202. The window 202 is made slightly larger than the size of the channel numbers 201 printed on the celluloid tape 124 to mask off the undesired portion of the celluloid tape except for the selected channel number. As previously described, the celluloid tape 124 is divided into groups of two or three channel numbers imprinted thereon and moves in synchronization with the detent mechanism to bring the corresponding group of channels between the two spools 120 and 122 into the reference viewing position behind window 17. FIGURE 7 shows three consecutive channel numbers 201 imprinted on the tape 124 rather than the two channel numbers 131 as shown in FIGURE 2.

The indicating slide 200 is mounted to slide vertically as previously described in relation to indicating slide 130 and is also coupled to the indicator lever arm 140 at point 142 for actuation as previously described. Again, the action of the tuning screws 48 upon the tuning lever 50 is transmitted by the shaft 146 to the indicator lever arm 140, raising or lowering the attached slide 200 to bring into visual position or reference viewing position the selected station and masking off the others.

The tape 124 in this modification may be made of an opaque material with the channel number forming a transparent portion of the opaque tape. A light 206 can be mounted on an extension 208 of bracket 139 with a reflector 210 to form a source of light that can be focused to shine on a back of tape 124, thereby producing an illuminating effect on the transparent numbers when observed through window 17.

The indicator assembly may be further modified by substituting a drum type dial or indicator 300 (FIGURE 9) and its associated mounting means and drive means for the two spools 120 and 122 and the celluloid tape 124 as previously described in FIGURES 2–8. The remainder of the indicator assembly is substantially the same. Either of the previously described indicating slides 130 or its modification 200 can be used in conjunction with the drum 300. In the present example, the indicating slide 130 will be used. The components that remain unchanged will be designated by the reference numerals previously applied in FIGURES 1–6.

Figure 9:
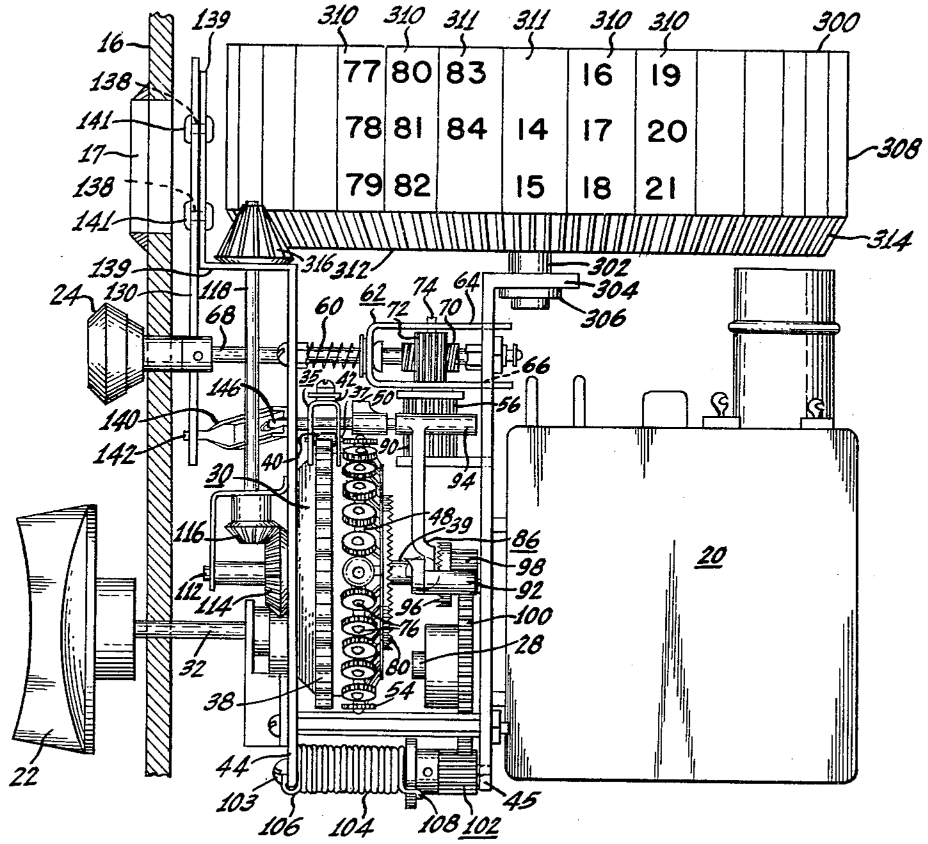
FIGURE 9 is a further modification of the channel indicator mechanism shown in FIGURES 2–4 and 7–8 including a drum type channel number indicator.

The modification consists of substituting a single dial or drum 300 for the combination of the spools 120 and 122 and the tape 124. The drum 300 includes a circular plastic shell 308 upon which, in the present example of twenty-four detent positions, twenty-two groups of three consecutive channel numbers 310 are printed vertically on the circumference thereof covering the channels in the ultra high frequency band except for two groups of two consecutive channel numbers 311 that correspond to the detent tuning positions at the extreme ends of the band. As shown in FIGURE 9, the two groups of two channel numbers 311 are at adjacent positions on the drum circumference 308 representing the rotational extremities of drum 300 while the other twenty-two groups are groups of three successive channel numbers 310 representing the remaining channels in the band.

The circular plastic shell 308 of drum 300 is mounted on a disk shaped solid base 312. The circumference of the base 312 is shaped into a bevel gear 314. The drum 300 is mounted by a shaft 302 permanently affixed to the solid base 312 at the central axis of rotation of the base. The shaft 302 is in turn bearing mounted to an extension 304 of the mounting bracket 45 and held in place by a C ring 306.

The drum 300 is coupled to rotate in synchronization with turret 30. As the turret 30 is rotated, the corresponding group of three or two consecutive channels is rotated into the reference viewing position behind window 17. The movement of turret 30 is picked up and transmitted to the shaft 118 in a manner as previously described in connection with the indicator assembly in FIGURES 2–8. A bevel gear 316 is connected to rotate with shaft 118 and meshes with the bevel gear 314 cut into the solid base 312. The gear ratio between the turret 30 and the drum 300 and the spacing between the sets of channel markings 310 and 311 is so selected that the corresponding set of channel numbers are switched into reference viewing position behind window 17 as the rotary turret 30 is switched from one detent position to the next.

The indicating slide 130 is positioned on the mounting bracket 139 between window 17 and drum 300 so that the corresponding set of channels for each detent position will appear behind the window 134. The indicator line 132 will designate the selected channel as the indicating slide is raised or lowered by the indicator lever arm 140. The action of the indicating slide 130 is the same as previously described whereby the vertical component of the motion of shaft 146 is transmitted through the indicator lever arm 140 causing the slide 130 to be raised or lowered to indicate the tuned station.

The indicator mechanisms and its modifications as described, provides an economical and improved channel indicator mechanism for a step-by-step preset UHF tuner, capable of indicating any of the 70 stations in the UHF band. The detent mechanism of the step-by-step tuner provides information for selecting a particular group of channels to be displayed at the corresponding detent position, while the preset tuning mechanism is coupled for automatic indication of the selected channel of the group of channels available to be tuned to at that particular detent position. In addition, the indicator mechanism provides a means by which any of the 70 UHF channels can be displayed at a relatively large size, but at the same time only requiring a minimum of physical space. Furthermore, the indicator mechanism, not shown, can also be attached to a combined VHF–UHF tuner to display all 82 channel numbers.

What is claimed is:

1. A channel indicator mechanism for television receivers having a tuner including means to provide step-by-step tuning of said tuner so that each step covers a portion of the television and means for presetting said tuner to select a desired channel at each step position comprising:
  - a dial member having a plurality of groups of channel indicia imprinted thereon, said plurality of groups of channel indicia indicating the channels that can be selected at said various step positions;
  - means coupling said dial member to said step-by-step tuning means for sequential display of said plurality of groups of channel indicia at a reference viewing position; and
  - indicating means coupled to said preset tuning means to designate a selected indicium of said group of channel indicia.

2. A channel indicator mechanism for television receivers having a tuner including means to provide step-by-step tuning of said tuner so that each step covers a portion of the television band and means for presetting said tuner to select a desired channel at each step position comprising:
  - a dial member having a plurality of groups of channel indicia thereon, said plurality of groups of channel indicia indicating the channels that can be selected at said various step positions;
  - means coupling said dial member to said step-by-step tuning means for moving said dial member to bring a different one of said plurality of groups of channel indicia into registry with a reference viewing position for each step position, the group of channel numbers at said reference viewing position corresponding to the channels which can be selected at the step position to which said tuner is set; and
  - indicating means coupled to said preset tuning means to designate a selected indicium of said group of channel indicia at said reference viewing position.

3. In a tuning mechanism for television receivers including a tuner with a detent means coupled to the tuner control shaft so that each detent position covers a portion of the television band and a preset mechanism for selecting a desired station at each detent position, the combination comprising:
  - a dial member having an indicia thereon of a plurality of groups of consecutive channel numbers, said plurality of groups of channel numbers indicating the channels that can be selected at the various detent stop positions;
  - means coupling said dial member to said detent means for moving said dial member to bring one of said groups of channel numbers into registry with a reference viewing position, the group of channel numbers at said reference viewing positions corresponding to the channels which can be selected at the detent position to which said tuner is set;
  - indicating means mounted adjacent said dial member; and
  - means coupling said indicating means to said preset tuning means whereby said indicating means designates the selected one of said channels in said group of channel numbers at said reference viewing position.

4. In a tuning mechanism for television receivers including a tuner with a detent means coupled to the tuner control shaft so that each detent stop position covers a portion of the television band and a preset mechanism for selecting a desired station at each detent stop position, the combination comprising:

a dial member having an indicia thereon of a plurality of groups of consecutive channel numbers, said groups of channel numbers indicating the channels that can be selected at the various detent stop positions;

means coupling said dial member to said detent means for sequential display of said corresponding groups of channel numbers in a reference position;

an indicating means mounted adjacent said dial member providing a window for limited viewing of portion of said dial means in said reference position; and means coupling said indicating means to said preset tuning means whereby said indicating means designates the selected one of said channel numbers in said group of channel numbers displayed in said reference position.

5. A channel indicator mechanism for television receivers having a tuner including means to provide step-by-step tuning of said tuner so that each step covers a portion of the television band and means for presetting said tuner to a desired channel at each step position comprising:

a pair of spools;

a mounting bracket mounting said pair of spools to said tuner;

a flexible tape, a portion of which is wound about each of said spools, said tape having a plurality of groups of consecutive channel numbers imprinted thereon, said groups of channel numbers indicating the channels that can be tuned to at the various step positions;

means coupling said pair of spools to said step-by-step tuning means for sequential positioning of said groups of channel numbers between said spools;

a movable slide loosely coupled to said mounting bracket;

an indicating means mounted upon said movable slide;

means coupling said preset means to said movable slide whereby said preset means moves said movable slide to designate a selected channel of said groups of channels available to be selected at the step positions.

6. A channel indicator mechanism for television receivers having a tuner including means to provide step-by-step tuning of said tuner so that each step covers a portion of the television band and means for presetting said tuner to select a desired channel at each step position comprising:

a circular drum mounted on said tuner having a plurality of groups of consecutive channel numbers imprinted on the circumference thereof, said group of channel numbers indicating the channel that can be tuned to at the various step positions;

a window mounted on said tuner for limited viewing of said drum;

means coupling said drum to said step-by-step tuning means for sequential positioning of said groups of channels in visual position behind said window;

a movable slide mounted on said tuner positioned between said window and said drum;

an indicating means mounted upon said movable slide; and means coupling said preset means to said movable slide whereby said preset means moves said movable slide to indicate a selected channel of said groups of channels available to be selected at the step division.

7. A channel indicator mechanism for television receivers having a tuner including means to provide step-by-step tuning of said tuner whereby each step covers a portion of the television band and means for presetting said tuner to select a desired channel at each step position comprising:

a pair of spools;

a mounting bracket mounting said pair of spools to said tuner;

a flexible tape, a portion of which is wound about each of said spools, said tape having a plurality of groups of consecutive channel numbers imprinted thereon, said groups of channel numbers indicating the channels that can be tuned to at the various step positions;

means coupling the first one of said pair of spools to said step-by-step tuning means for sequential positioning of said groups of channel numbers between said spools;

spring bias means coupled to the second one of said pair of spools, said spring bias increased when said flexible tape is unwound from second spool when said step-by-step means calls for rotation in one direction, whereby said increased spring bias rewinds said tape about said second spool when said step-by-step means calls for the rotation of said first spool in the opposite direction;

a movable slide loosely coupled to said mounting bracket;

an indicating means mounted upon said movable slide; and means coupling said preset means to said movable slide whereby said preset means moves said movable slide to designate a selected channel of said groups of channels available to be selected at the step positions.

8. A channel indicator mechanism for television receivers having a tuner including means to provide step-by-step tuning of said tuner whereby each step covers a portion of the television band and means for presetting said tuner to select a desired channel at each step position comprising:

a pair of spools;

a mounting bracket mounting said pair of spools to said tuner;

a movable tape, a portion of which is wound about each of said spools, said tape having a plurality of groups of consecutive channel numbers imprinted vertically thereon, said group of channel numbers indicating the channels that can be tuned to at the various step positions;

means coupling the first one of said pair of spools to said step-by-step tuning means for sequential positioning of said groups of channel numbers between said spools;

spring bias means coupled to the second one of said pair of spools, said spring bias increased when said flexible tape is unwound from second spool when said step-by-step means calls for rotation in one direction, whereby said increased spring bias rewinds said tape about said second spool when said step-by-step means calls for the rotation of said first spool in the opposite direction;

a flexible band coupled between said pair of spools;

a movable slide loosely coupled to said spool mounting frame being able to move in a vertical direction with preset limits;

an indicating means mounted upon said movable slide; and means coupling said preset means to said movable slide whereby said preset means moves said movable slide vertically to designate a tuned channel of said groups of channels available to be tuned to at the step positions.

9. A television tuning mechanism comprising in combination:

a television tuner including a rotatable control shaft;

a rotary turret having a plurality of adjustable control elements;

detent means coupled with said rotary turret for providing a plurality of detent stop positions corresponding to the number of adjustable control elements;

lever means positioned for engagement with said successive ones of said adjustable control elements at each detent stop position;

coupling means coupling said lever means and said turret to said tuner control shaft wherein said lever means and said turret act together upon said coupling means to rotate said control shaft;

means for effecting adjustment of said adjustable control elements;

means for rotating said turret through the plurality of detent positions to bring successive ones of said control elements into engagement with said lever means;

a dial member having an indicia thereon of a plurality of groups of channel numbers, said groups of channel numbers indicating the channels that can be tuned to at the various stop positions;

means coupling said dial member to said rotary turret for sequential indication of said groups of channel numbers; and an indicating means coupled to said lever means whereby said motion of said lever means as it engages with successive ones of said adjustable control elements at each detent stop position moves said indicating means to designate the selected channel of said group of channels available to be selected at the corresponding detent stop position.

10. A tuning mechanism for ultra high frequency television tuners comprising in combination:

an ultra high frequency television tuner including an adjustable control shaft for continuously tuning said tuner through the ultra high frequency band;

detent means providing a plurality of stop positions, the number of stop positions being significantly less than the number of ultra high frequency channels;

coupling means coupling said detent means to said tuner shaft whereby a plurality of television channels are covered by each detent stop position;

preset tuning means coupled to said coupling means for adjusting said tuner control shaft in each of said stop positions to tune said tuner to select a desired one of said plurality of channels covered by each of said stop positions;

a dial member having an indicia thereon of a plurality of groups of channel numbers that can be tuned to at the various detent stop positions, said dial member being coupled and movable in step with said detent means for sequential indication of said groups of channel numbers;

an indicating means mounted adjacent to said dial member providing a window for limited viewing of said dial member; and means coupling said indicating means to said preset tuning means whereby said indicating means designates the selected one of said channels in said group of channel numbers available to be selected at the particular detent position.

11. A channel indicator mechanism for television receivers having a tuner including means to provide step-by-step tuning of said tuner so that each step covers a portion of the television band and means for presetting said tuner to select a desired channel at each step position comprising:

a dial member having an indicia thereon of a plurality of groups of consecutive channel numbers, said plurality of groups of channel numbers designating the channels that can be selected at said various step positions;

a fixed window mounted for limited viewing of said dial member;

means coupling said dial member to said step-by-step tuning means for moving said dial member to bring one of said groups of channel numbers into registry with said fixed window, the group of channel numbers in registry with said window corresponding to the channels which can be selected at the corresponding step position to which said tuner is set; and an indicating means including a window, said indicating means being coupled to said preset tuning means to display the selected channel number while masking off the remainder of the dial member in registry with the fixed window.

12. A channel indicator mechanism for television receivers having a tuner including means to provide step-by-step tuning of said tuner so that each step covers a portion of the television band and means for presetting said tuner to selected a desired channel at each step position comprising:

a dial member having a plurality of groups of channel indicia thereon, said plurality of groups of channel indicia indicating the channels that can be selected at said various step positions;

means coupling said dial member to said step-by-step tuning means for moving said dial member to bring a different one of said plurality of groups of channel indicia into registry with a reference viewing position for each step position, the group of channel numbers at said reference viewing position corresponding to the channels which can be selected at the step position to which said tuner is set;

an illuminating source, and indicating means coupled to said preset tuning means to provide for the illumination of a selected indicium of said group of channel indicia by said illuminating source at said reference viewing position.

References Cited by the Examiner

UNITED STATES PATENTS

| | | | |
|---|---|---|---|
| 2,746,419 | 5/56 | Serge | 116—124.1 |
| 2,772,353 | 11/56 | Browder | 116—124.1 X |

BROUGHTON G. DURHAM, *Primary Examiner.*

MILTON KAUFMAN, *Examiner.*

UNITED STATES PATENT OFFICE

CERTIFICATE OF CORRECTION

Patent No. 3,192,779 July 6, 1965

Theodore D. Smith

It is hereby certified that error appears in the above numbered patent requiring correction and that the said Letters Patent should read as corrected below.

Column 3, line 57, for "on" read -- or --; column 10, line 65, for "with" read -- within --.

Signed and sealed this 18th day of January 1966.

(SEAL)
Attest:

ERNEST W. SWIDER
Attesting Officer

EDWARD J. BRENNER
Commissioner of Patents